United States Patent
Takayama et al.

(10) Patent No.: US 11,848,134 B2
(45) Date of Patent: Dec. 19, 2023

(54) WIRE-WOUND CORE, COIL COMPONENT, AND METHOD OF MANUFACTURING COIL COMPONENT

(71) Applicant: Murata Manufacturing Co., Ltd., Kyoto-fu (JP)

(72) Inventors: Kota Takayama, Nagaokakyo (JP); Masashi Miyamoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 399 days.

(21) Appl. No.: 17/102,619

(22) Filed: Nov. 24, 2020

(65) Prior Publication Data
US 2021/0175000 A1 Jun. 10, 2021

(30) Foreign Application Priority Data
Dec. 6, 2019 (JP) ................. 2019-221079

(51) Int. Cl.
*H01F 17/04* (2006.01)
*H01F 41/07* (2016.01)
*H01F 27/28* (2006.01)
*H01F 27/29* (2006.01)
*H01F 41/076* (2016.01)

(52) U.S. Cl.
CPC ....... *H01F 17/045* (2013.01); *H01F 27/2823* (2013.01); *H01F 27/292* (2013.01); *H01F 41/076* (2016.01)

(58) Field of Classification Search
CPC .. H01F 17/045; H01F 27/2823; H01F 27/292; H01F 41/076
See application file for complete search history.

(56) References Cited

U.S. PATENT DOCUMENTS

| 2007/0063804 | A1* | 3/2007 | Watanabe | H01F 3/10 336/83 |
| 2012/0133469 | A1* | 5/2012 | Tomonari | H01F 27/292 336/192 |
| 2017/0004919 | A1* | 1/2017 | Dinh | H05K 1/18 |

(Continued)

FOREIGN PATENT DOCUMENTS

| CN | 106340373 A | 1/2017 |
| JP | S57-97918 U | 6/1982 |

(Continued)

*Primary Examiner* — Marlon T Fletcher
*Assistant Examiner* — Malcolm Barnes
(74) *Attorney, Agent, or Firm* — Studebaker & Brackett PC

(57) ABSTRACT

A wire-wound core includes a wound core portion and a first flange and a second flange provided on a first end portion and a second end portion, respectively. The first flange has a bottom surface facing a mounting substrate during mounting, a top surface facing away from the bottom surface, an inner end surface coupling the bottom surface with the top surface and facing the wound core portion, an outer end surface facing away from the inner end surface, and a first side surface and a second side surface that face away from each other and each couple the bottom surface with the top surface and the inner end surface with the outer end surface. In a region of the outer end surface close to the bottom surface, a first inclined surface inclined toward the inner end surface as the first inclined surface approaches the bottom surface is provided.

20 Claims, 3 Drawing Sheets

(56) References Cited

U.S. PATENT DOCUMENTS

| | | | | |
|---|---|---|---|---|
| 2017/0025212 A1* | 1/2017 | Jerez | ................ | H01F 27/29 |
| 2017/0229226 A1* | 8/2017 | Igarashi | ................ | H01F 3/10 |
| 2017/0287634 A1* | 10/2017 | Baba | ................ | H01F 17/0033 |
| 2018/0366259 A1* | 12/2018 | Mikogami | ................ | H01F 3/10 |
| 2021/0065960 A1* | 3/2021 | Shinohara | ................ | H01F 27/24 |

FOREIGN PATENT DOCUMENTS

| | | | |
|---|---|---|---|
| JP | H0128644 Y2 | | 8/1989 |
| JP | H0624970 Y2 | | 6/1994 |
| JP | 08279416 A | * | 10/1996 |
| JP | H08279416 A | | 10/1996 |
| JP | H10-135048 A | | 5/1998 |
| JP | 2004-228361 A | | 8/2004 |
| JP | 3771308 B2 | | 4/2006 |
| JP | 2014-216347 A | | 11/2014 |
| JP | 5796603 B2 | | 10/2015 |
| JP | 2016076593 A | * | 5/2016 |
| JP | 2017-017288 A | | 1/2017 |
| WO | 2016/032005 A1 | | 3/2016 |
| WO | 2018008699 A1 | | 1/2018 |

\* cited by examiner

WIRE-WOUND CORE, COIL COMPONENT, AND METHOD OF MANUFACTURING COIL COMPONENT

CROSS-REFERENCE TO RELATED APPLICATION

This application claims benefit of priority to Japanese Patent Application No. 2019-221079, filed Dec. 6, 2019, the entire content of which is incorporated herein by reference.

BACKGROUND

Technical Field

The present disclosure relates to a wire-wound core, a coil component including the wire-wound core, and a method of manufacturing the coil component. In particular, the present disclosure relates to a form of the wire-wound core.

Background Art

A wire-wound type coil component includes a wire-wound core including a wound core portion having a first end portion and a second end portion that are opposite to each other in the axial direction of the wound core portion and including a first flange and a second flange that are provided on the first end portion and the second end portion of the wound core portion, respectively; a first terminal electrode and a second terminal electrode that are provided on the first flange and the second flange, respectively; and at least one wire that is would around the wound core portion while the wire is connected between the first terminal electrode and the second terminal electrode.

Each of the first flange and the second flange has a bottom surface facing a mounting substrate during mounting, a top surface facing away from the bottom surface, an inner end surface coupling the bottom surface with the top surface and facing the wound core portion, an outer end surface facing away from the inner end surface, and a first side surface and a second side surface that face away from each other and each couple the bottom surface with the top surface and the inner end surface with the outer end surface.

Each of the first terminal electrode and the second terminal electrode covers the bottom surface of a corresponding flange of the first flange and the second flange and extends from the bottom surface to a portion of each of the inner end surface, the outer end surface, the first side surface, and the second side surface.

As a coil component having such a structure, for example, International Publication No. 2018/008699 and Japanese Patent No. 3771308 disclose a coil component including a first terminal electrode and a second terminal electrode. In each of the first terminal electrode and the second terminal electrode, when measured from a bottom surface toward a top surface, the dimension of a portion extending along an outer end surface of a flange is longer than the dimension of a portion extending along an inner end surface. In short, when a side surface of the flange is viewed as the front, an edge of each of the terminal electrodes extends diagonally.

According to the terminal electrode having such an above-described form, while a sufficient distance between the portion of the terminal electrode extending along the inner end surface of the flange and a wire wound around a wound core portion is ensured, the dimension of a portion of the terminal electrode contributing to formation of a solder fillet during mounting, that is, the dimension of the portion of the terminal electrode extending along the outer end surface of the flange in the height direction is elongated, and an area to which plating is applied can thereby be increased.

SUMMARY

However, even in the coil component having such an above-described advantage, a disadvantage is found in view of a manufacturing process of the coil component.

The terminal electrodes are formed through a step in which a conductive paste layer that is to be a base layer is formed on the wire-wound core by dipping a predetermined portion of each flange of the wire-wound core in a conductive paste. When such dipping is performed and if terminal electrodes having an edge extending, not diagonally, but in a direction parallel to the bottom surface of the flange are formed, formation of a conductive paste layer of each of the first terminal electrode and the second terminal electrode is completed by a single dipping operation only in which the bottom surface of the first flange and the bottom surface of the second flange are simultaneously pushed toward the conductive paste.

In contrast, when terminal electrodes having an edge extending diagonally are formed, formation of a conductive paste layer of each of the first terminal electrode and the second terminal electrode is not completed by a single dipping operation only. For example, as FIGS. 1 and 3 of Japanese Patent No. 3771308 illustrate, the dipping operation needs to be performed twice; that is, a first dipping operation for forming a conductive paste layer that is to be a base layer of the first terminal electrode on the first flange side and a second dipping operation for forming a conductive paste layer that is to be a base layer of the second terminal electrode on the second flange side need to be performed. Thus, the number of steps increases, and a decrease in productivity of coil components is thereby caused.

Accordingly, the present disclosure provides a wire-wound core having a form enabling a terminal electrode to be formed on each of a first flange and a second flange by a single dipping operation only and to have a form in which, when measured from a bottom surface toward a top surface, the dimension of a portion extending along an outer end surface is longer than the dimension of a portion extending along an inner end surface.

In addition, the present disclosure provides a coil component that includes the above-described wire-wound core and in which, while a sufficient distance between the portion of the terminal electrode extending along the inner end surface of the corresponding flange and a wire wound around a wound core portion is ensured, the dimension of the portion of the terminal electrode extending along the outer end surface of the flange in the height direction is elongated.

In addition, the present disclosure provides a method of manufacturing the above-described coil component including the wire-wound core.

According to a one embodiment of the present disclosure, a wire-wound core includes a wound core portion having a first end portion and a second end portion that are opposite to each other in an axial direction of the wound core portion and a first flange and a second flange that are provided on the first end portion and the second end portion of the wound core portion, respectively. The first flange has a bottom surface facing a mounting substrate during mounting, a top surface facing away from the bottom surface, an inner end surface coupling the bottom surface with the top surface and facing the wound core portion, an outer end surface facing away from the inner end surface, and a first side surface and a second side surface that face away from each other and each couple the bottom surface with the top surface and the inner end surface with the outer end surface.

In the wire-wound core, in a region of the outer end surface of the first flange close to the bottom surface, a first inclined surface inclined toward the inner end surface as the first inclined surface approaches the bottom surface is provided.

According to another embodiment of the present disclosure, a coil component includes the wire-wound core; a first terminal electrode and a second terminal electrode that are provided on the first flange and the second flange, respectively; and at least one wire that is wound around the wound core portion while the wire is connected between the first terminal electrode and the second terminal electrode. The first terminal electrode covers the bottom surface of the first flange and extends from the bottom surface to a portion of each of the inner end surface, the outer end surface, the first side surface, and the second side surface.

In the coil component, when measured in a direction from the bottom surface toward the top surface, in the first terminal electrode, a dimension of a portion extending along the outer end surface is longer than a dimension of a portion extending along the inner end surface.

According to another embodiment of the present disclosure, a method of manufacturing a coil component includes a step of preparing the wire-wound core, a step of preparing a paste bath in which a conductive paste is accumulated in a predetermined thickness, a step of forming a conductive paste layer on each of the first flange and the second flange by dipping a portion of the wire-wound core in the conductive paste in the paste bath, and a step of firing the conductive paste layer.

In the method of manufacturing the coil component, the conductive paste layer in which, when measured in a direction from the bottom surface toward the top surface, a dimension of a portion extending along the outer end surface is longer than a dimension of a portion extending along the inner end surface is formed by pushing the first flange and the second flange simultaneously toward the conductive paste during the dipping.

During such pushing, on the inner end surface side of each of the flanges, wetting up of the conductive paste is caused only in a direction of pushing. However, on the outer end surface side of each of the flanges, in which the first inclined surface is included, in addition to the wetting up of the conductive paste in the direction of pushing, the conductive paste also flows in a direction perpendicular to the direction of pushing, that is, in a direction away from the inclined surface. This is because the inclined surface keeps the conductive paste out following the pushing of the wire-wound core into the conductive paste. Thus, a raised portion of the conductive paste is formed on the inclined surface side of each of the flanges. As a result, the conductive paste layer in which, when measured from the bottom surface toward the top surface, the dimension of the portion extending along the outer end surface is longer than the dimension of the portion extending along the inner end surface can be formed by a single dipping operation.

According to the above described configurations, the terminal electrode can be formed on each of the first flange and the second flange by a single dipping operation only and has a form in which, when measured from the bottom surface toward the top surface, the dimension of the portion extending along the outer end surface is longer than the dimension of the portion extending along the inner end surface.

Other features, elements, characteristics and advantages of the present disclosure will become more apparent from the following detailed description of some embodiments of the present disclosure with reference to the attached drawings.

BRIEF DESCRIPTION OF THE DRAWINGS

FIG. 4A illustrates a state before the wire-wound core is dipped in a conductive paste and FIG. 4B illustrates a state after the wire-wound core is dipped in the conductive paste.

DETAILED DESCRIPTION

A coil component 1 according to an embodiment of the present disclosure will be described with reference to FIG. 1. Regarding the coil component 1 illustrated in FIG. 1, a surface that faces a mounting substrate during mounting faces upward.

Figure 1:
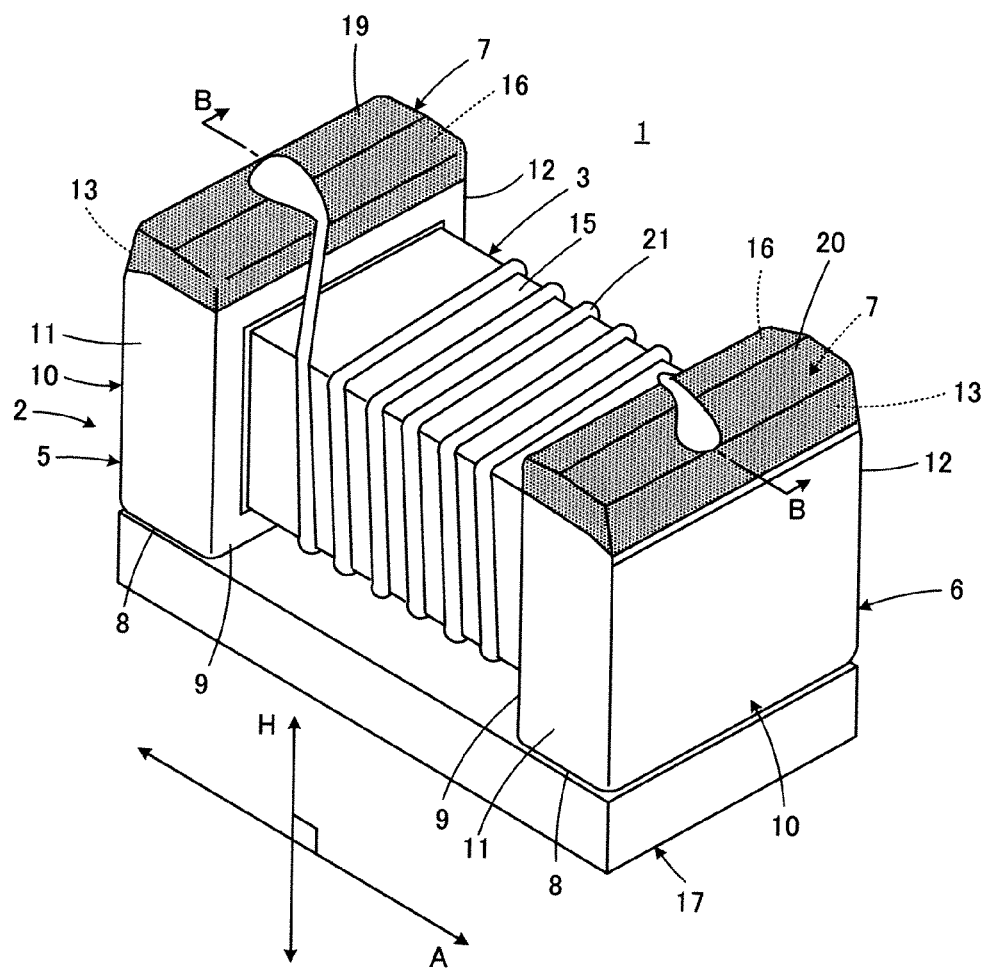
FIG. 1 is an external perspective view of a coil component according to an embodiment of the present disclosure, and, in FIG. 1, a surface of the coil component that faces a mounting substrate during mounting is located on the upper side.

As FIG. 1 illustrates, the coil component 1 includes a wire-wound core 2. The wire-wound core 2 is typically constituted by ferrite. Other than ferrite, the wire-wound core 2 may also be constituted by, for example, a sintered body of alumina or the like or a shaped body of, for example, a resin containing magnetic metal powder and insulating filler. The wire-wound core 2 includes a wound core portion 3 having a first end portion and a second end portion that are opposite to each other in the axial direction A of the wound core portion 3 and also includes a first flange 5 and a second flange 6 that are provided on the first end portion and the second end portion of the wound core portion 3, respectively. The dimension of the wire-wound core 2 in the axial direction A is, for example, about 0.4 mm or more to about 4.5 mm or less (i.e., from about 0.4 mm to about 4.5 mm); however, the dimension is not particularly limited.

Figure 2:
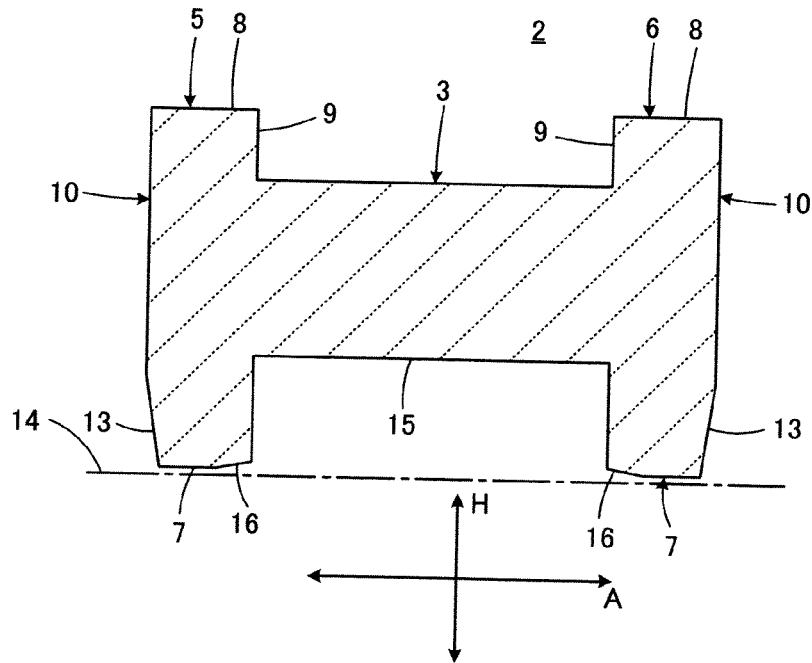
FIG. 2 is a sectional view, taken along line B-B in FIG. 1, of only a wire-wound core that is included in the coil component illustrated in FIG. 1 and that is illustrated in an inverted manner with respect to FIG. 1.

In FIG. 2, the wire-wound core 2 that is included in the coil component 1 illustrated in FIG. 1 is illustrated alone. FIG. 2 is a sectional view taken along line B-B in FIG. 1 and the wire-wound core 2 is illustrated in an inverted manner with respect to FIG. 1. The first flange 5 and the second flange 6 that are included in the wire-wound core 2 have shapes substantially symmetrical to each other. Thus, the first flange 5 will be described in detail, and the detailed description of the second flange 6 will be omitted.

In FIGS. 1 and 2, the first flange 5 has a bottom surface 7 facing a mounting substrate during mounting, a top surface 8 facing away from the bottom surface 7, an inner end surface 9 coupling the bottom surface 7 with the top surface 8 and facing the wound core portion 3, an outer end surface 10 facing away from the inner end surface 9, and a first side surface 11 and a second side surface 12 that face away from each other and each couple the bottom surface 7 with the top surface 8 and the inner end surface 9 with the outer end surface 10.

In a region of the outer end surface 10 close to the bottom surface 7, a first inclined surface 13 inclined toward the inner end surface 9 as the first inclined surface 13 approaches the bottom surface 7 is provided. The first inclined surface 13 is preferably inclined at about 75 degrees or more to about 85 degrees or less (i.e., from about 75 degrees to about 85 degrees), for example, about 80 degrees with respect to a mounting surface 14 (refer to FIG. 2) parallel to the axial direction A. Due to such an inclination at about 75 degrees or more, the size of the mounting surface 14 is ensured, and the stability of the coil component 1 during mounting is thereby improved. On the other hand, due to such an inclination at about 85 degrees or less, the accuracy of the dimensions and the shape required for a metal mold used for forming a wire-wound core is suppressed from excessively increasing, and productivity is thereby improved.

When a direction from the bottom surface 7 of the flange 5 toward the top surface 8 of the flange 5 is the height direction H, in the height direction H, the position of an edge of the first inclined surface 13 close to the top surface 8 is preferably lower than the position of a lower surface 15 of the wound core portion 3 close to the bottom surface 7. By the first inclined surface 13 being positioned lower than the lower surface 15 of the wound core portion 3, the influence on a region through which magnetic flux passes can be reduced.

To simplify the metal mold for shaping the wire-wound core 2 and to improve manufacturing efficiency, the first inclined surface 13 is preferably provided across an entire region of the outer end surface 10 between the first side surface 11 and the second side surface 12. The first inclined surface 13 can alternatively be provided in a portion of the region of the outer end surface 10 between the first side surface 11 and the second side surface 12.

In the illustrated embodiment, although the first inclined surface 13 is constituted by a single flat surface, the first inclined surface 13 may alternatively be constituted by a curved surface that forms a concavity or a convexity or by a plurality of surfaces connected to one another with a corresponding bent portion interposed between the respective surfaces.

In a region of the bottom surface 7 of the flange 5 close to the inner end surface 9, a second inclined surface 16 inclined toward the top surface 8 as the second inclined surface 16 approaches the inner end surface 9 may also be provided. Thus, damage to a wire 21 when the wire 21 is pressure-bonded onto a terminal electrode 19, which will be described below, can be reduced. In the height direction H from the bottom surface 7 toward the top surface 8, the position of an edge of the second inclined surface 16 close to the inner end surface 9 is lower than the position of the edge of the first inclined surface 13 close to the top surface 8. Thus, it is possible for the terminal electrode 19 not to be excessively close to the wire 21 wound around the wound core portion 3.

An interior angle between the bottom surface 7 and the first inclined surface 13 is preferably smaller than an interior angle between the bottom surface 7 and the second inclined surface 16. Thus, a portion of the terminal electrode 19 on the outer end surface 10 side is likely to be higher than a portion of the terminal electrode 19 on the inner end surface 9 side, and damage to the wire 21 when the wire 21 is pressure-bonded onto the terminal electrode 19 is thereby easily reduced.

As with the case of the first inclined surface 13, to simplify the metal mold for shaping the wire-wound core 2 and to improve manufacturing efficiency, the second inclined surface 16 is preferably provided across an entire region of the bottom surface 7 between the first side surface 11 and the second side surface 12. However, the second inclined surface 16 can alternatively be provided in a portion of the region of the bottom surface 7 between the first side surface 11 and the second side surface 12.

When measured in the axial direction A, the dimension of a portion of the bottom surface 7 extending parallel to the axial direction A is preferably about 40% or more to about 95% or less (i.e., from about 40% to about 95%) of the maximum dimension between the inner end surface 9 and the outer end surface 10, that is, the maximum dimension in the thickness direction of the flange 5. The portion of the bottom surface 7 extending parallel to the axial direction A is a portion of the bottom surface 7 except for the first inclined surface 13 when only the first inclined surface is provided out of the first inclined surface 13 and the second inclined surface 16 and is a portion of the bottom surface 7 except for the first inclined surface 13 and the second inclined surface 16 when both the first inclined surface 13 and the second inclined surface 16 are provided.

As described above, the dimension of the portion of the bottom surface 7 extending parallel to the axial direction A is about 40% or more of the dimension of the flange 5 in the thickness direction, and it is thereby possible to ensure the stability of the orientation of the coil component 1 during a mounting step and to ensure a high fixing force between the coil component 1 and the mounting substrate after mounting. On the other hand, the dimension of the portion of the bottom surface 7 extending parallel to the axial direction A is about 95% or less of the dimension of the flange 5 in the thickness direction, and it is thereby possible to easily ensure the first inclined surface 13.

The references 7, 8, 9, 10, 11, 12, 13, and 16 used to denote the bottom surface, the top surface, the inner end surface, the outer end surface, the first side surface, the second side surface, the first inclined surface, and the second inclined surface in the above-described first flange 5, respectively, may also be used to denote the respective parts in the second flange 6 as needed.

The coil component 1 further includes a top plate 17 that is a magnetic material disposed so as to couple the top surfaces 8 of the first flange 5 and the second flange 6 to each other. The top plate 17 is joined to the top surface 8 of each of the first flange 5 and the second flange 6 by using an adhesive. In a case where the wire-wound core 2 and the top plate 17 are both made of a magnetic material such as ferrite or a magnetic material such as a resin containing ferrite powder or magnetic metal powder, the wire-wound core 2 and the top plate 17 form a closed magnetic circuit. Instead of the top plate 17, a coating of a resin or a coating of a resin containing magnetic material powder as needed may be applied so as to couple the top surfaces 8 of the first flange 5 and the second flange 6 to each other, and such a coating may be caused to function as a magnetic material.

As FIG. 1 illustrates, the coil component 1 further includes the first terminal electrode 19 and a second terminal electrode 20 that are provided on the first flange 5 and the second flange 6, respectively. The coil component 1 also includes the wire 21 that is would around the wound core portion 3 while the wire 21 is connected between the first terminal electrode 19 and the second terminal electrode 20.

Each of the first terminal electrode 19 and the second terminal electrode 20 covers the bottom surface 7 of a corresponding flange of the first flange 5 and the second flange 6 and extends from the bottom surface 7 to a portion of each of the inner end surface 9, the outer end surface 10, the first side surface 11, and the second side surfaces 12.

The terminal electrodes 19 and 20 are formed, for example, by applying, as a conductive material, a conductive paste containing conductive metal powder such as Ag powder and glass powder to a predetermined portion of each of the flanges 5 and 6 through dipping and by subsequently baking the applied conductive paste. Thus, it is possible to form the terminal electrodes 19 and 20 that are low in cost and are brought into highly close contact with the wire-wound core 2 that is a sintered body. At least one type of plating out of, for example, Ni plating, Cu plating, and Sn plating may further be applied as needed. In all cases, the form of the terminal electrodes 19 and 20 is predominantly influenced by the form of the layer formed on each of the flanges 5 and 6 through baking of the conductive paste as described above, that is, the form of the layer constituted by the sintered body containing a conductive material and glass.

Figure 3:
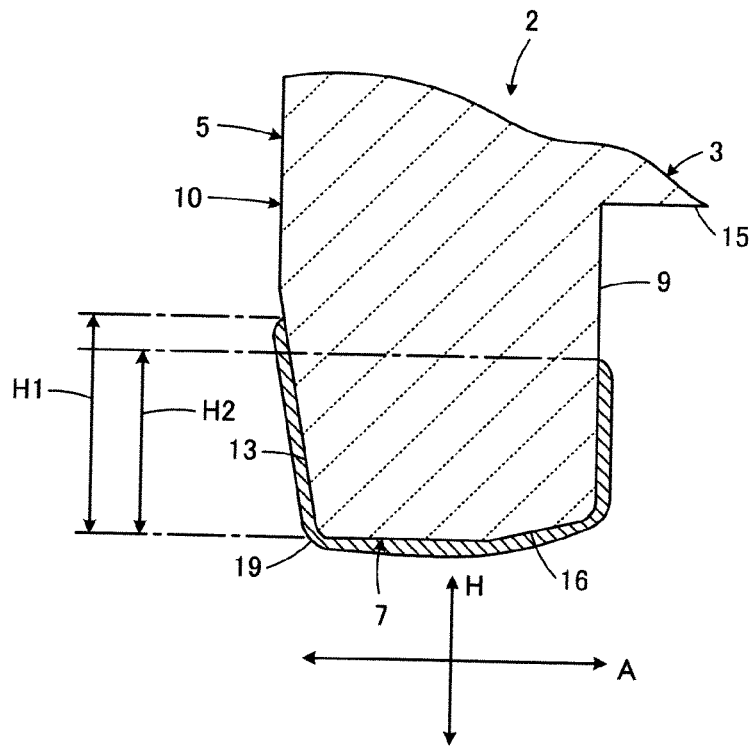
FIG. 3 is an enlarged sectional view of a portion of the wire-wound core illustrated in FIG. 2 and illustrates a state where a first terminal electrode is formed.

As FIG. 3 illustrates a portion of the first flange 5 in an enlarged manner, when measured in the height direction H from the bottom surface 7 toward the top surface 8, in the first terminal electrode 19, dimension H1 of a portion extending along the outer end surface 10 is longer than dimension H2 of a portion extending along the inner end surface 9. Thus, while a sufficient distance between the portion of the first terminal electrode 19 extending along the inner end surface 9 of the flange 5 and the wire 21 wound around the wound core portion 3 is ensured, the dimension of the portion of the first terminal electrode 19 extending along the outer end surface 10 of the flange 5 in the height direction H is elongated, and an area to which plating is applied can thereby be increased. Therefore, in a state where the coil component 1 is solder-mounted onto the mounting substrate, an advantageous effect of being able to form a solder fillet having a smoothly curved surface can be expected.

Although not illustrated in FIG. 3, the second terminal electrode 20 has a form similar to that of the first terminal electrode 19.

The first terminal electrode 19 and the second terminal electrode 20 that have such an above-described form are formed through a step of dipping a portion of the wire-wound core 2 in a conductive paste. Such a dipping step is characterized by inclusion of a step of pushing the bottom surface of the first flange 5 and the bottom surface of the second flange 6 simultaneously toward the conductive paste. Hereinafter, a method of forming the terminal electrodes 19 and 20 on the wire-wound core 2 will be described with reference to FIGS. 4A and 4B.

Figure 4A:
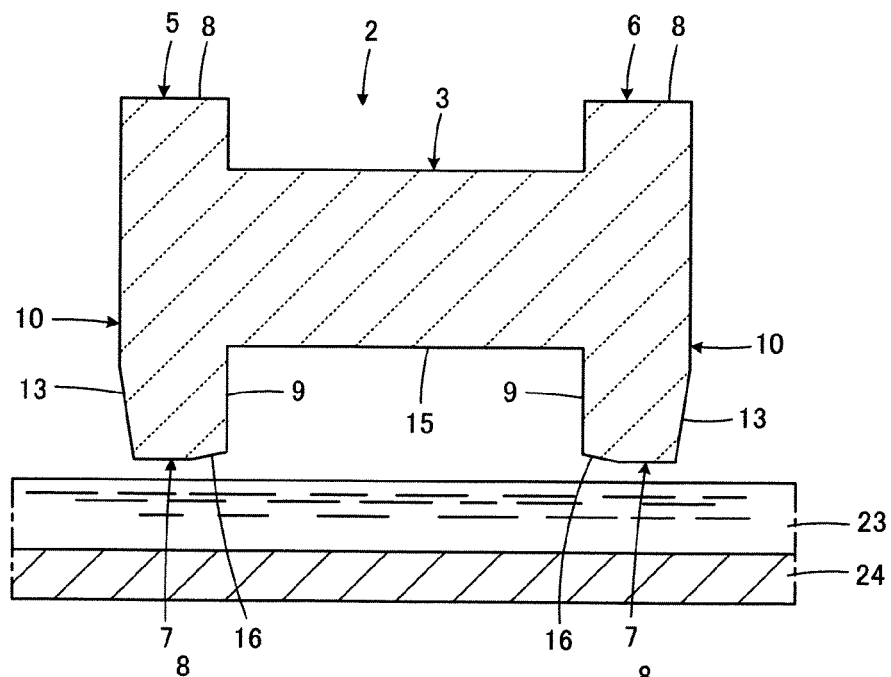
FIGS. 4A and 4B illustrate a method of forming the first terminal electrode and a second terminal electrode on the wire-wound core illustrated in FIG. 2.

As FIG. 4A illustrates, the wire-wound core 2 and a paste bath 24 in which the conductive paste 23 is accumulated in a predetermined thickness are prepared. The wire-wound core 2 is disposed in a state where the bottom surface 7 of each of the flanges 5 and 6 of the wire-wound core 2 faces the conductive paste 23.

Figure 4B:
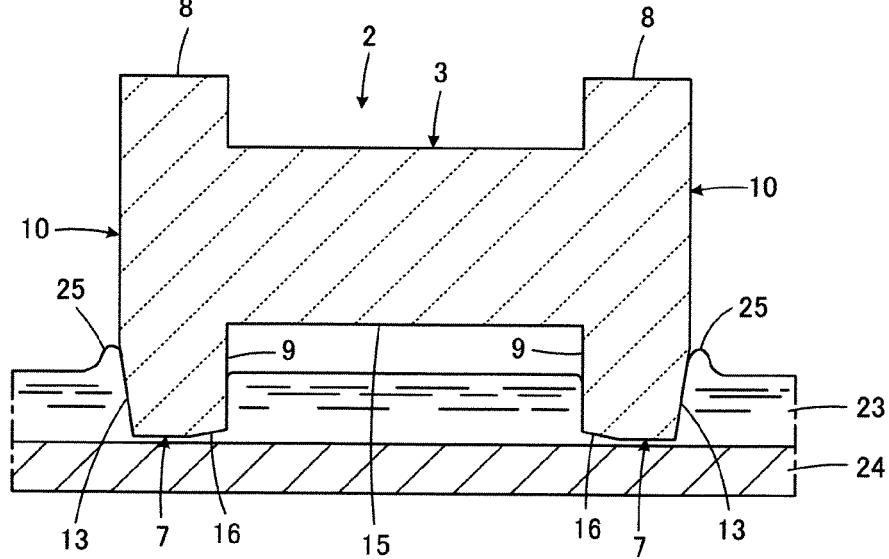

Next, as FIG. 4B illustrates, the wire-wound core 2 is dipped in the conductive paste 23 in the paste bath 24 while maintaining the above-described orientation. Thus, the bottom surface 7 of the first flange 5 and the bottom surface 7 of the second flange 6 are simultaneously pushed toward the conductive paste 23.

At this time, on the inner end surface 9 side of each of the flanges 5 and 6, wetting up of the conductive paste 23 is caused only in a direction of pushing. However, on the outer end surface 10 side of each of the flanges 5 and 6, in which the first inclined surface 13 is included, in addition to the wetting up of the conductive paste 23 in the direction of pushing, the conductive paste 23 also flows in a direction perpendicular to the direction of pushing, that is, in a direction away from the first inclined surface 13. This is because the first inclined surface 13 keeps the conductive paste 23 out following the pushing of the wire-wound core 2 into the conductive paste 23. Thus, a raised portion 25 of the conductive paste 23 is formed on the first inclined surface 13 side of each of the flanges 5 and 6. As a result, conductive paste layers that are to be the terminal electrodes 19 and 20 can be formed by a single dipping operation. As FIG. 3 illustrates, when measured in the height direction H from the bottom surface 7 toward the top surface 8, in each conductive paste layer, dimension H1 of a portion extending along the outer end surface 10 is longer than dimension H2 of a portion extending along the inner end surface 9. In the present embodiment, an edge of the portion extending along the outer end surface 10 of each of the terminal electrodes 19 and 20 is located at a position in the corresponding first inclined surface 13.

The conductive paste layers are then fired, and the terminal electrodes 19 and 20 each constituted by a layer of a sintered body containing a conductive material and glass are formed. Thereafter, at least one type of plating out of, for example, Ni plating, Cu plating, and Sn plating is applied as needed.

As FIG. 1 illustrates, the wire 21 is wound around the wound core portion 3 of the wire-wound core 2 on which the terminal electrodes 19 and 20 are provided as described above. The wire 21 is constituted by, for example, a copper wire with an insulation coating of an electrical insulating resin such as polyamido-imide, polyurethane, or polyester-imide. One end of the wire 21 is connected to the first terminal electrode 19 and the other end of the wire 21 is connected to the second terminal electrode 20. For connection of the wire 21 to the terminal electrode 19 and to the terminal electrode 20, methods such as thermocompression bonding, ultrasonic welding, and laser welding are applicable. The wire 21 may be wound so as to form multiple layers as needed.

The above-described second inclined surface 16 exhibits an advantageous effect when the wire 21 is connected to each of the terminal electrodes 19 and 20 by thermocompression bonding. That is, due to the second inclined surface 16, sharpness of a ridge where the bottom surface 7 of each of the flanges 5 and 6 and the corresponding inner end surface 9 intersect each other decreases, and it is thereby possible to reduce damage to which the wire 21 is likely to be subjected when the wire 21 is pressure-bonded toward each of the terminal electrodes 19 and 20.

In a case where the terminal electrode formed on the bottom surface of the flange is plated by, for example, Sn plating, the size of the external shape of the terminal electrode may often be increased by a plating layer being flattened to extend from the bottom surface of the flange when the wire is thermocompression-bonded to the terminal electrode. As a result, the dimensions of the coil component as a product tend to be increased. To avoid such undesired circumstances, the dimensions of the wire-wound core need to be decreased in advance, in expectation of an increase in the dimensions due to thermocompression bonding. However, if the dimensions of the wire-wound core are decreased, a winding region of the wire is limited, and characteristics such as inductance are thereby inevitably sacrificed. In addition, miniaturization of the wire-wound core causes a decrease in strength of the wire-wound core.

However, the present embodiment enables the first inclined surface 13 to absorb the above-described extended portion of the plating layer generated by thermocompression bonding of the wire 21 to each of the terminal electrodes 19 and 20, thereby reducing the influence on the outside dimensions of the coil component 1. Thus, it is possible to avoid sacrificing characteristics of the coil component 1 and to avoid causing a decrease in strength.

In the present embodiment, as described above, the edge of the portion of each of the terminal electrodes 19 and 20 extending along the corresponding outer end surface 10 is located at a position in the corresponding first inclined surface 13. In addition, as described above, in the height direction H, the position of the edge of the first inclined surface 13 close to the top surface 8 is lower than the position of the lower surface 15 of the wound core portion 3. Thus, even when magnetic flux passing through the wound core portion 3 constitutes a closed magnetic circuit due to the top plate 17 or the resin coating containing magnetic material powder, it is possible to avoid the magnetic flux from being blocked due to the portion of each of the terminal electrodes 19 and 20 extending along the corresponding outer end surface 10. Such avoidance of the blockage contributes to maintaining desired characteristics of the coil component 1.

Although the embodiments by which the present disclosure is illustrated are described, other various modifications can be made within the scope of the present disclosure.

The above-described coil component is used advantageously as, for example, a car-mounted inductor; however, the uses of the coil component are not limited.

Other than a coil component that constitutes a single coil as with the illustrated embodiment, the above-described coil component may constitute a common mode choke coil or may constitute a transformer, a balun, or the like. Thus, the number of wires is also changed in accordance with functions of a coil component, and the number of terminal electrodes provided on each flange can be changed accordingly.

The shapes of the wire-wound core and the top plate that are included in the above-described coil component are not limited to the illustrated shapes and can be changed as appropriate in accordance with a desired design.

When the above-described coil component is configured, between the different embodiments described in the present specification, the constituents can partially be replaced or combined with each other.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:
   a wire-wound core comprising:
      a wound core portion having a first end portion and a second end portion that are opposite to each other in an axial direction of the wound core portion;
      a first flange and a second flange that are provided on the first end portion and the second end portion of the wound core portion, respectively;
      the first flange having
         a bottom surface facing a mounting substrate during mounting,
         a top surface facing away from the bottom surface,
         an inner end surface coupling the bottom surface with the top surface and facing the wound core portion,
         an outer end surface facing away from the inner end surface, and
         a first side surface and a second side surface that face away from each other and each couple the bottom surface with the top surface and the inner end surface with the outer end surface;
   a first terminal electrode and a second terminal electrode that are provided on the first flange and the second flange, respectively; and
   at least one wire that is wound around the wound core portion while the wire is connected between the first terminal electrode and the second terminal electrode, wherein
   a first inclined surface that is inclined toward the inner end surface as the first inclined surface approaches the bottom surface is provided in a region of the outer end surface proximate to the bottom surface,
   the first terminal electrode covers the bottom surface of the first flange and extends from the bottom surface to a portion of each of the inner end surface, the outer end surface at the first inclined surface, the first side surface, and the second side surface, and
   when measured in a direction from the bottom surface toward the top surface, in the first terminal electrode, a dimension of a portion extending along the outer end surface at the first inclined surface is longer than a dimension of a portion extending along the inner end surface.

2. The coil component according to claim 1, wherein the first terminal electrode includes a layer that is on the first flange and constituted by a sintered body containing a conductive material and glass.

3. The coil component according to claim 1, further comprising:
   a magnetic material disposed so as to couple the top surface of the first flange with a top surface of the second flange,
   wherein the wire-wound core and the magnetic material provide a closed magnetic circuit.

4. The coil component according to claim 1, wherein when the direction from the bottom surface toward the top surface is a height direction, in the height direction, a position of an edge of the first terminal electrode proximate to the outer end surface is lower than a position of a lower surface of the wound core portion proximate to the bottom surface.

5. The coil component according to claim 2, further comprising:
   a magnetic material disposed so as to couple the top surface of the first flange with a top surface of the second flange,
   wherein the wire-wound core and the magnetic material provide a closed magnetic circuit.

6. The coil component according to claim 2, wherein when the direction from the bottom surface toward the top surface is a height direction, in the height direction, a position of an edge of the first terminal electrode proximate to the outer end surface is lower than a position of a lower surface of the wound core portion proximate to the bottom surface.

7. The coil component according to claim 1, wherein the first inclined surface is configured to be inclined at an angel from about 75 degrees to about 85 degrees with respect to a mounting surface parallel to the axial direction.

8. A wire-wound core comprising:
a wound core portion having a first end portion and a second end portion that are opposite to each other in an axial direction of the wound core portion; and
a first flange and a second flange that are provided on the first end portion and the second end portion of the wound core portion, respectively,
the first flange having
a bottom surface facing a mounting substrate during mounting,
a top surface facing away from the bottom surface,
an inner end surface coupling the bottom surface with the top surface and facing the wound core portion,
an outer end surface facing away from the inner end surface, and
a first side surface and a second side surface that face away from each other and each couple the bottom surface with the top surface and the inner end surface with the outer end surface, wherein
a first inclined surface that is inclined toward the inner end surface as the first inclined surface approaches the bottom surface is provided in a region of the outer end surface proximate to the bottom surface,
in a region of the bottom surface proximate to the inner end surface, a second inclined surface inclined toward the top surface as the second inclined surface approaches the inner end surface is provided, and
when a direction from the bottom surface toward the top surface is a height direction, a position of an edge of the second inclined surface proximate to the inner end surface is lower than a position of an edge of the first inclined surface proximate to the top surface in the height direction.

9. The wire-wound core according to claim 8, wherein when a direction from the bottom surface toward the top surface is a height direction, in the height direction, a position of an edge of the first inclined surface proximate to the top surface is lower than a position of a lower surface of the wound core portion proximate to the bottom surface.

10. The wire-wound core according to claim 8, wherein the first inclined surface is provided across an entire region of the outer end surface between the first side surface and the second side surface.

11. The wire-wound core according to claim 8, wherein an interior angle between the bottom surface and the first inclined surface is smaller than an interior angle between the bottom surface and the second inclined surface.

12. The wire-wound core according to claim 8, wherein the second inclined surface is provided across an entire region of the bottom surface between the first side surface and the second side surface.

13. The wire-wound core according to claim 8, wherein when measured in the axial direction, a dimension of a portion of the bottom surface extending parallel to the axial direction is from 40% to 95% of a maximum dimension between the inner end surface and the outer end surface.

14. A method of manufacturing a coil component, the method comprising:
preparing the wire-wound core according to claim 8;
preparing a paste bath in which a conductive paste is accumulated in a predetermined thickness;
forming a conductive paste layer on each of the first flange and the second flange by dipping a portion of the wire-wound core in the conductive paste in the paste bath; and
firing the conductive paste layer,
wherein, the conductive paste layer in which, when measured in a direction from the bottom surface toward the top surface, a dimension of a portion extending along the outer end surface is longer than a dimension of a portion extending along the inner end surface is formed by pushing the first flange and the second flange simultaneously toward the conductive paste during the dipping.

15. The wire-wound core according to claim 9, wherein the first inclined surface is provided across an entire region of the outer end surface between the first side surface and the second side surface.

16. The wire-wound core according to claim 11, wherein the second inclined surface is provided across an entire region of the bottom surface between the first side surface and the second side surface.

17. The wire-wound core according to claim 11, wherein when measured in the axial direction, a dimension of a portion of the bottom surface extending parallel to the axial direction is from 40% to 95% of a maximum dimension between the inner end surface and the outer end surface.

18. A coil component comprising:
the wire-wound core according to claim 9;
a first terminal electrode and a second terminal electrode that are provided on the first flange and the second flange, respectively; and
at least one wire that is wound around the wound core portion while the wire is connected between the first terminal electrode and the second terminal electrode,
wherein the first terminal electrode covers the bottom surface of the first flange and extends from the bottom surface to a portion of each of the inner end surface, the outer end surface, the first side surface, and the second side surface, and
wherein, when measured in a direction from the bottom surface toward the top surface, in the first terminal electrode, a dimension of a portion extending along the outer end surface is longer than a dimension of a portion extending along the inner end surface.

19. A method of manufacturing a coil component, the method comprising:
preparing the wire-wound core according to claim 9;
preparing a paste bath in which a conductive paste is accumulated in a predetermined thickness;
forming a conductive paste layer on each of the first flange and the second flange by dipping a portion of the wire-wound core in the conductive paste in the paste bath; and
firing the conductive paste layer,
wherein, the conductive paste layer in which, when measured in a direction from the bottom surface toward the top surface, a dimension of a portion extending along the outer end surface is longer than a dimension of a portion extending along the inner end surface is formed by pushing the first flange and the second flange simultaneously toward the conductive paste during the dipping.

20. The wire-wound core according to claim 8, wherein the first inclined surface is configured to be inclined at an angel from about 75 degrees to about 85 degrees with respect to a mounting surface parallel to the axial direction.

\* \* \* \* \*